June 14, 1955  W. L. WEAKLEND  2,710,518
GRASS DEFLECTOR FOR MOWERS
Filed Aug. 9, 1952

INVENTOR.
Walter L. Weaklend
BY
Thos. E. Scofield
ATTORNEY.

United States Patent Office 2,710,518
Patented June 14, 1955

2,710,518

GRASS DEFLECTOR FOR MOWERS

Walter L. Weaklend, Lee's Summit, Mo., assignor to Rockledge Manufacturing Company, a corporation of Missouri Application August 9, 1952, Serial No. 303,477

16 Claims. (Cl. 56—314)

The present invention relates in general to grass deflector boards for mowers, and it deals more particularly with mechanism for automatically raising and lowering such boards depending upon the direction of travel of the mower or that part thereof carrying the board; this application is an improvement of my copending application Serial No. 216,114, filed March 17, 1951, now Patent No. 2,627,157.

Grass deflector boards for mowing machines are well known. Attached to the end of the cutter bar of a mower, the board deflects inwardly the falling cut grass at the end of the swath leaving the edge of the swath clear to assist the operator in guiding the mower when he cuts the next adjacent course. Some boards are mounted to yield resiliently vertically and laterally so as to be able to pass over or by obstructions. However, this alone does not adequately take care of the difficulty that arises when the machine reaches the end of a course and is turned to cut the next course. To turn the mower, the operator usually locks the tractor wheel nearest the mower and advances the opposite tractor wheel, a maneuver which causes the end of the cutter bar to move rearwardly and drag the deflector board backwardly over the ground. Such rearward movement imposes strain and stress upon the board for which it was not designed with the result that deflector boards are apt to and often do become broken when the mowing machine is being turned.

In my prior application Serial No. 216,114, I disclosed mechanism for automatically elevating a grass deflector board during such time as it is moved rearwardly over the ground and then lowering the board to its normal working height upon resumption of forward movement. This arrangement completely eliminates the problem of breakage referred to above and is entirely satisfactory from an operational standpoint; however, existing mowers differ from one another somewhat in construction making it difficult in some instances to incorporate therein or add thereto the mechanism of my prior application.

It is an object of the present invention to overcome this difficulty. More specifically, it is an object to provide a mechanism for automatically raising and lowering the grass board, as aforesaid, which mechanism can be quickly and very easily installed on existing mowers without any alteration thereof and regardless of the individual variations in the design of the mowers made by different manufacturers.

Another object is to provide a universally usable kit for conversion of existing mowers to automatic operation of the character indicated, said kit including along with the essential components of the mechanism for raising and lowering the grass board a simple adapter fitting by which this mechanism can be properly mounted on and integrated with the existing components of the mower to achieve the desired mode of operation.

A further object is to provide a mechanism which is simpler and less expensive to manufacture than that disclosed in my prior application but which is equally satisfactory and foolproof, and as a matter of fact has certain operational advantages. A feature of my new mechanism resides in the arrangement employed to adjust the height to which the grass board will be elevated upon rearward movement of same and to otherwise adjust the assembled mechanism for proper operation under all conditions of installation.

Other objects and features will appear in the course of the following description of the invention.

In the accompanying drawings which form a part of the specification and are to be read in conjunction therewith and in which like reference numerals are employed to indicate like parts of the various views.

Referring more particularly to the drawings, the cutter bar 12, its end shoe 13 and the grass deflector board 18 which is pivoted on the end shoe at 19, all correspond to the similarly numbered elements shown in my prior application Serial No. 216,114. As well understood by those versed in the art and as more fully disclosed in my prior application, the cutter bar in practice is attached to a tractor and arranged to be drawn thereby over the ground, its direction of travel during the cutting operation being such that the end shoes moves with the cutter bar in the direction indicated by the arrow in Fig. 2; during such forward travel the grass board 18 is generally horizontal and serves to deflect inwardly the falling cut grass so that the edge of the swath is left clear.

Figure 1:
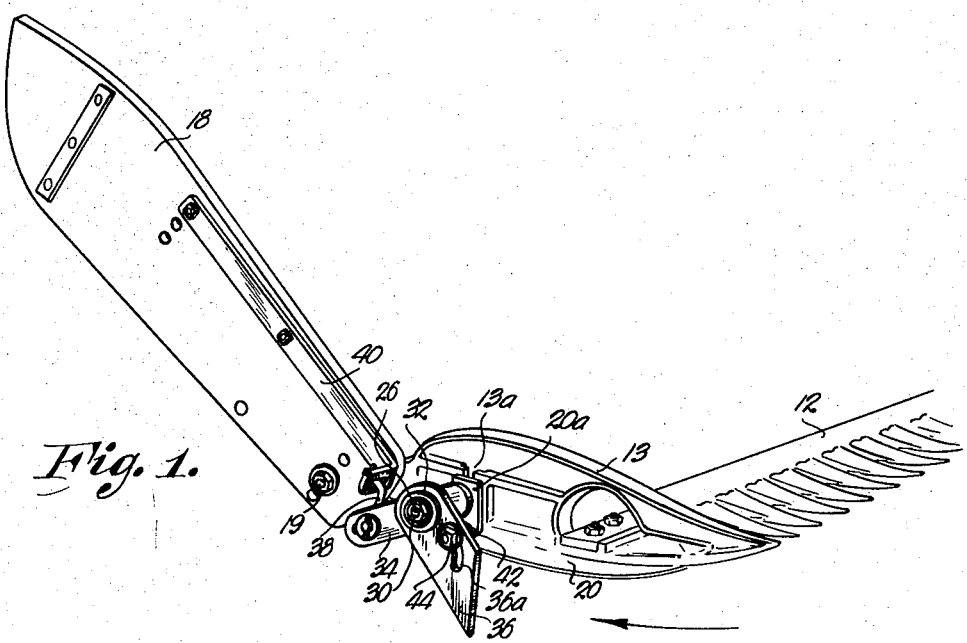
Fig. 1 is a perspective view of the outer end of the cutter bar of a mowing machine having my mechanism thereon, showing the grass deflector board elevated as takes place upon rearward movement of same.

However, in turning the mower at the end of its course, as must be done, for example, when it reaches the end of the field preparatory to cutting the next swath, the cutter bar or, at least, the outer portion thereof carrying the end shoe travels rearwardly as indicated by the arrow in Fig. 1, and it is this turning operation which so often leads to breakage of the grass deflector board if the latter is not lifted from its normal generally horizontal position.

Figure 5:
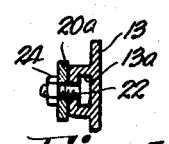
Fig. 5 is a cross section similar to Fig. 4, but showing the conventional arrangement of parts when my invention is not used.

Now, in conventional mowers of this type the end shoe is provided with a skid 20 which rides on the ground and thus carries the weight of the outer end of the cutter bar. To permit adjustment of the elevation of the outer end of the cutter bar, the skid is mounted on the end shoe for vertical adjustment relative thereto, this normally being accomplished by means of a short bolt 22 having a square head received in a vertical retaining channel 13a in the shoe; as shown in Fig. 5 the shank of the bolt extends through an apertured bracket 20a on the skid and receives a nut 24 by which the bracket is clamped in position to the shoe.

Figure 3:
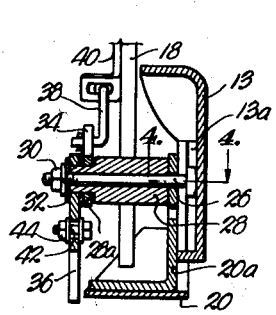
Fig. 3 is an enlarged cross section taken along the line 3—3 of Fig. 2 in the direction of the arrows.
Figure 4:
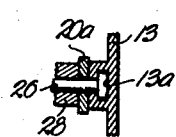
Fig. 4 is a fragmentary cross section taken along the line 4—4 of Fig. 3 in the direction of the arrows.

According to the present invention, I substitute for the bolt 24 a similar bolt 26 having a longer stem (see Figs. 3 and 4) and utilize an adapter or support bushing or mounting sleeve 28 which is inserted on the stem of the bolt adjacent the outer face of the skid bracket 20a, the whole assembly being held in place on the shoe by a clamping nut 30. By loosening the latter nut, the head of the bolt can be shifted up or down in the channel 13a to adjust the skid vertically, but when the nut is tightened both the skid and the bushing 28 are secured rigidly to the shoe in adjusted position.

The outer end of the bushing is of reduced size, and journaled thereon between the shoulder 28a and an enlarged washer 32 which abuts the end of the bushing are a pair of independently movable lever members 34 and 36 disposed side by side. The first of these is a generally horizontal rocker arm slotted at its rear end to receive a laterally projecting portion of link 38. The other end of the link is received in a horizontally slotted portion of a bracket 40 fastened to the deflector board 18, the two ends of the link being secured against withdrawal from their respective slots by means of washers and cotter pins as shown, whereby rocker arm 34 and the grass deflector board are articulated through the medium of link 38 to move together.

Lever 36 depends from its pivot and is cut off diagonally to form a pointed lower end adapted to engage the ground in dragging fashion. This drag member contains an elongated curved slot 36a through which there extends a bolt 42, the latter being adjustable to any position along the slot and secured in adjusted position by a nut 44.

The operation of the apparatus will for the most part be self-evident. During the normal mowing operation when the cutter bar and its end shoe 13 are traveling forwardly as indicated by the arrow in Fig. 2, the grass deflector board 18 is free to swing under the influence of gravity down to the generally horizontal position illustrated so that it functions in conventional fashion to deflect inwardly the cut grass at the outer edge of the swath; as shown, the ground engaging drag member 36 swings freely to the rear on such forward movement of the shoe, assuming an idle trailing position in which it exerts no influence on the grass deflector board.

However, when in the course of making a turn the shoe 13 reverses its direction of travel, as shown by the arrow in Fig. 1, drag member 36 shifts forwardly bringing the head of bolt 42 against the underside of the forward portion of rocker arm 34 and exerting an upward thrust thereon. This thrust causes arm 34 to turn counterclockwise so that its rear end moves downwardly, drawing the forward end of the grass deflector board downwardly through the medium of link 38. Accordingly, the board swings about its pivot 19 elevating the main rear portion as illustrated.

The height to which the grass board will be elevated upon such rearward movement of shoe 13 can easily be adjusted by adjusting the position of bolt 42 along slot 36a. That is to say, if the bolt is positioned near upper extremity of the slot, it obviously will lift the forward end of lever arm 34 higher when drag member 36 occupies a given forward position such as that shown in Fig. 1, than will be the case if the bolt is positioned near the lower extremity in the slot; and this in turn determines how high the grass deflector board will be elevated.

Figure 2:
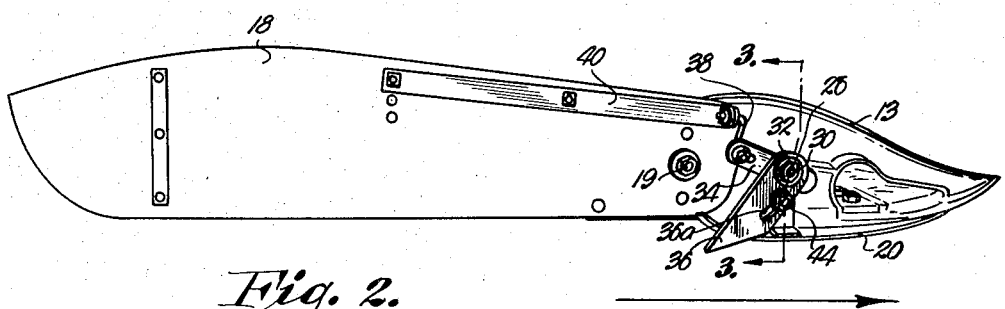
Fig. 2 is a side elevational view corresponding to the above, but showing the deflector board in the lowered position it occupies during normal forward movement of the cutter bar, that is to say during the mowing operation.

Whatever the position of bolt 42 in slot 36a, it will be seen that when the drag 36 shifts from its Fig. 2 to its Fig. 1 position upon a reversal in the direction of the end shoe 13, there always is some lost motion or free travel of the drag member before the head of the bolt engages lever 34 to begin lifting the grass deflector board. The amount of lost motion which occurs before lever 34 begins to turn with the drag member again depends upon the position to which the bolt has been adjusted in the slot. Regardless of the amount of lost motion in the connection between these two elements and regardless of the height to which the grass deflector board is elevated, it always returns to the same generally horizontal position (see Fig. 2) upon resumption of forward travel of the mower after making a turn. The curvature of slot 36a is such that the head of bolt 44 will engage lever 34 at substantially the same point regardless of where the bolt is located along the slot.

Existing mowers having no provision for elevation of the grass board can easily be converted for automatic elevation thereof as described, simply by the addition to the mower of my adapter bushing 28, the lever members 34 and 36 swiveled thereon, a suitable bracket such as 40 and a link 38, all of which parts are simple and economical to manufacture for sale in kit form and easy to install quickly and without special tools.

From the foregoing, it will be seen that this invention is one well adapted to attain all of the ends and objects hereinbefore set forth, together with other advantages which are obvious and which are inherent to the apparatus.

It will be understood that certain features and subcombinations of utility may be employed without reference to other features and subcombinations. This is contemplated by and is within the scope of the appended claims.

Inasmuch as various possible modifications of the invention may be made without departing from the scope thereof, it is to be understood that all matter herein set forth or shown in the accompanying drawings is to be interpreted as illustrative and not in a limiting sense.

Having thus described my invention, I claim:

1. In a mowing machine of the type having a cutter bar and a grass deflector board pivotally carried on the end of the cutter bar for up and down swinging movement; the improvement which comprises a ground-engaging drag member movably mounted on the cutter bar for forward and rearward movement relative thereto, whereby said member tends to shift forwardly or rearwardly upon a reversal in the direction of travel of the cutter bar, linkage interconnecting said drag member and said deflector board and operated by shifting of the drag member to raise and lower the deflector board, said linkage including a lost motion connection intermediate the drag member and deflector board.

2. In a mowing machine of the type having a cutter bar and a grass deflector board pivotally carried on the end of the cutter bar for up and down swinging movement; the improvement which comprises a ground-engaging drag member movably mounted on the cutter bar for forward and rearward movement relative thereto, whereby said member tends to shift forwardly or rearwardly upon a reversal in the direction of travel of the cutter bar, linkage interconnecting said drag member and said deflector board and operated by shifting of the drag member to raise and lower the deflector board, said linkage including a lost motion connection intermediate the drag member and deflector board, and adjustable means for varying the amount of lost motion in said connection.

3. In a mowing machine of the type having a cutter bar and a grass deflector board pivotally carried on the end of the cutter bar for up and down swinging movement; the improvement which comprises a first member connected to the deflector board to move therewith, a ground engaging drag member movably mounted on the cutter bar for forward and rearward movement relative thereto, whereby said last member tends to shift forwardly or rearwardly depending upon the direction of travel of the cutter bar, said last member being freely movable in one of said directions independently of said first member, and the respective members having cooperating thrust transmitting portions positioned to engage one another upon predetermined movement of said last member in the other direction, thereby to cause said first member to move with said last member and thus produce a corresponding movement of the deflector board about its pivot.

4. In a mowing machine of the type having a cutter bar and a grass deflector board pivotally carried on the end of the cutter bar for up and down swinging movement; the improvement which comprises a first member connected to the deflector board to move therewith, a ground engaging drag member movably mounted on the cutter bar for forward and rearward movement relative thereto whereby said last member tends to shift forwardly or rearwardly depending upon the direction of travel of the cutter bar, a thrust transmitting element mounted on one of said members for engagement with the other member upon predetermined movement of said last member in the other one of said directions thereby to cause said first member to move therewith and thus produce a corresponding movement of the deflector board about its pivot, said thrust transmitting element being adjustable in position on said one member to vary said predetermined movement.

5. In a mowing machine of the type having a cutter bar with an end shoe and a grass deflector board pivoted on the shoe to swing up and down; the improvement which comprises a ground engaging drag member movably mounted on said shoe for forward and rearward movement relative thereto, whereby said member tends to shift forwardly or rearwardly upon reversal in the direction of travel of the shoe, linkage interconnecting said drag member and said deflector board and operated by shifting of the drag member to raise and lower the deflector board, said linkage including a lost motion connection intermediate the drag member and deflector board.

6. In a mowing machine of the type having a cutter bar with an end shoe and a grass deflector board pivoted on the shoe to swing up and down; the improvement which comprises a ground engaging drag member movably mounted on the shoe for forward and rearward movement relative thereto, whereby said member tends to shift forwardly or rearwardly upon a reversal in the direction of travel of the shoe, linkage interconnecting said drag member and said deflector board and operated by shifting of the drag member to raise and lower the deflector board, said linkage including a lost motion connection intermediate the drag member and deflector board, and adjustable means for varying the amount of lost motion in said connection.

7. In a mowing machine of the type having a cutter bar with an end shoe and a grass deflector board pivotally mounted on the shoe to swing up and down, the improvement which comprises a first member connected to said deflector board to move therewith, a ground engaging drag member movably mounted on the shoe for forward and rearward movement relative thereto, whereby said last member tends to shift in one direction upon forward movement of the shoe and in the opposite direction upon rearward movement of the shoe, said last member being freely movable in one of said directions independently of said first member, and the respective members having cooperating thrust transmitting portions positioned to engage one another upon predetermined movement of said last member in the other direction thereby to cause said first member to move therewith and thus produce a corresponding movement of the deflector board about its pivot.

8. In a mowing machine of the type having a cutter bar with an end shoe and a grass deflector board pivotally mounted on the shoe to swing up and down, the improvement which comprises a first member connected to said deflector board to move therewith, a ground-engaging drag member movably mounted on the shoe for forward and rearward movement relative thereto, whereby said last member tends to shift in one direction upon forward movement of the shoe and in the opposite direction upon rearward movement of the shoe, said last member being freely movable in one of said directions independently of said first member, means for causing said first member to move with said last member upon predetermined movement of the latter in the other direction thereby to produce a corresponding movement of the deflector board about its pivot, said last means comprising a thrust element positioned on one of said members for engagement with the other member upon said predetermined movement, said element being adjustable in position on said one member for varying the extent of said predetermined movement.

9. In a mowing machine of the type having a cutter bar with an end shoe and a grass deflector board pivotally mounted on the shoe to swing up and down; the improvement which comprises a ground-engaging drag member pivotally mounted on said shoe to swing forwardly or rearwardly depending upon the direction of travel of the shoe, a second member disposed beside the first member and pivotally mounted on the shoe to turn about the same axis as said first member, said first member being freely swingable in one of said directions independently of said second member, the respective members having cooperating thrust transmitting portions positioned to engage one another upon predetermined swinging movement of said first member in the other direction thereby to cause said second member to swing therewith, and linkage between said second member and said deflector board to produce a corresponding movement of the deflector board about its pivot upon swinging of said second member.

10. In a mowing machine of the type having a cutter bar with an end shoe and a grass deflector board pivotally mounted on the shoe to swing up and down; the improvement which comprises a ground-engaging drag member pivotally mounted on said shoe to swing forwardly or rearwardly depending upon the direction of travel of the shoe, a second member disposed beside the first member and pivotally mounted on the shoe to turn about the same axis as said first member, said second member being connected to said deflector board, said first member being freely swingable in one of said directions independently of said second member, means for causing said second member to move with said first member upon predetermined swinging movement of the same in the other direction thereby to produce a corresponding movement of the deflector board about its pivot, said last means comprising a thrust element positioned on one of said members for engagement with the other member upon said predetermined movement, said element being adjustable in position on said one member for varying the extent of said predetermined movement.

11. A mowing machine as in claim 10 wherein said one member has an elongated slot and said element is movable longitudinally in the slot with means for immobilizing it in any adjusted position therein.

12. In a mowing machine of the type having a cutter bar with an end shoe and a grass deflector board pivotally mounted on the shoe to swing up and down; the improvement which comprises a support bushing adapted to be mounted on said end shoe, a pair of members pivoted to said bushing to swing independently of one another about the same axis, means connecting one of said members to the deflector board to swing the latter about its pivot upon swinging of said one member about said axis, the other member having a portion in dragging engagement with the ground whereby said last member tends to turn in one direction about said axis when the shoe travels forwardly and in the opposite direction when the shoe travels rearwardly, the respective members having cooperating thrust transmitting portions positioned to engage one another upon predetermined movement of said last member in said opposite direction thereby to cause said first member to move therewith and thus produce a corresponding movement of the deflector board about its pivot.

13. A mowing machine as in claim 12 wherein said support bushing is vertically adjustable on said end shoe.

14. A mowing machine as in claim 12 wherein one of said thrust transmitting portions comprises an element carried by one of said members and adjustable in position thereon.

15. In a mowing machine of the type having a cutter bar with an end shoe and a grass deflector board pivotally mounted on the shoe to swing up and down; the improvement which comprises a support on said shoe positioned forwardly of the deflector board's pivot, a generally horizontal rocker arm pivoted intermediate its ends on said support, linkage between the rear end of said arm and said deflector board for swinging the latter upon rocking of said arm, a second arm hingedly depending from said support with its lower end in dragging engagement with the ground whereby said last arm tends to swing in one direction upon forward movement of the shoe and in the opposite direction upon rearward movement of the shoe, and a lateral projection on said last arm adapted to engage the forward portion of said first arm to turn the latter upon movement of said last arm in said opposite direction.

16. A mowing machine as in claim 15 wherein said projection is adjustable in position on said last arm.

References Cited in the file of this patent
UNITED STATES PATENTS

| | | |
|---|---|---|
| 789,422 | Hagler | May 9, 1905 |
| 2,488,750 | Ulrich | Nov. 22, 1949 |
| 2,627,157 | Weaklend | Feb. 3, 1953 |